June 5, 1934.  C. F. EMERY, JR  1,962,060
HOSE CONNECTION
Filed Oct. 2, 1933
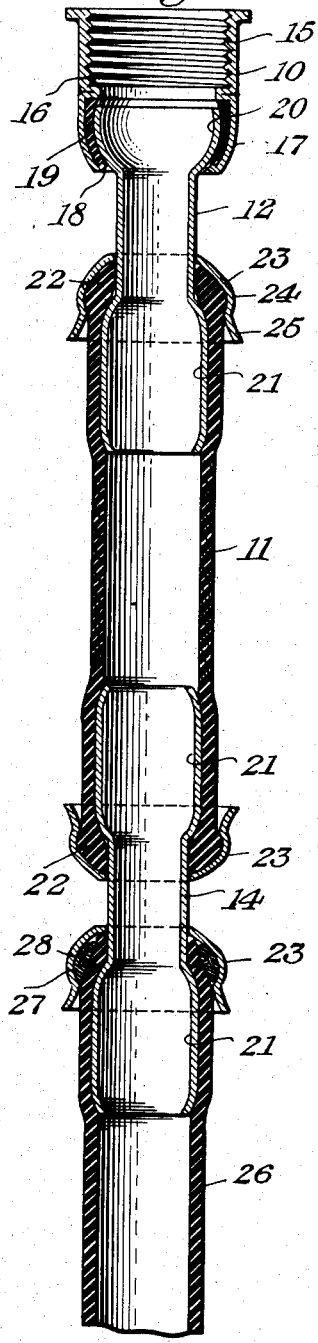
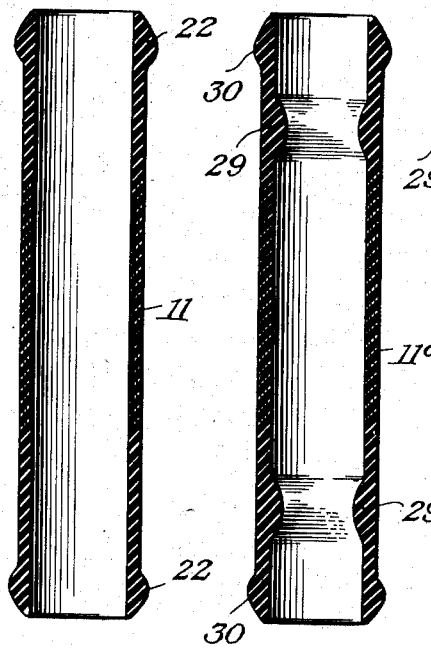
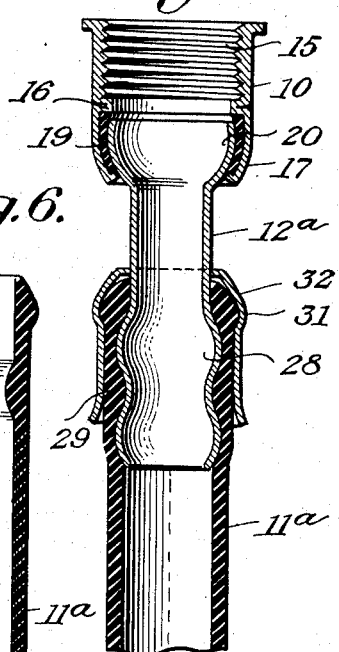
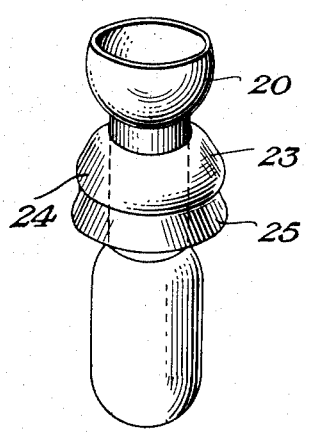
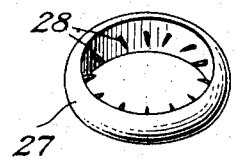
Charles Franklin Emery Jr.
INVENTOR
BY Victor J. Evans & Co.
ATTORNEYS Patented June 5, 1934

1,962,060

UNITED STATES PATENT OFFICE 1,962,060

HOSE CONNECTION

Charles Franklin Emery, Jr., Houston, Tex.

Application October 2, 1933, Serial No. 691,873

2 Claims. (Cl. 285—84)

The object of the invention is to provide a hose connection to be attached to fire hydrants or to ordinary hydrants, so that hose may be instantly and effectively connected and yet not be subject to the usual bending strain in use; to provide a device adapted for coupling hose sections together quickly and effectively without the necessity for having to turn the hose, as is the case with screwed connections; and to provide a device of the kind indicated which is of simple form and therefore susceptible of cheap manufacture.

With this object in view, the invention consists in a construction and combination of parts of which a preferred embodiment is illustrated in the accompanying drawing but to which embodiment the invention is not to be restricted. Continued use in practice may dictate certain changes or alterations and the right is claimed to make any which fall within the scope of the annexed claims.

In the drawing:

Figure 1 is a longitudinal diametrical sectional view of the invention.

Figure 2 is a longitudinal diametrical sectional view of the tubular rubber element comprised in the invention.

Figure 3 is a perspective view of the universal coupling element comprised in the invention.

Figure 4 is a perspective view of the separate attachable bead employed in effecting connections between hose sections.

Figure 5 is a view similar to Figure 1 but showing a modified form of the invention.

Figure 6 is a view similar to Figure 2 of the tubular rubber element employed in connection with that form of the invention shown in Figure 5.

The invention comprises a coupling element 10, a flexible tubular element 11 and the coupling members 12 and 14, the coupling element 10 being internally threaded as indicated at 15 for connection to the discharge nozzle of a hydrant and is shouldered, as indicated at 16, below the threaded portion, being rolled below this shoulder into the zone of a sphere as indicated at 17. The coupling member 16 is open at the under side of the spherical portion 17 and is inturned at the edge of the latter as indicated at 18, so that a gasket 19 may be received between this inturned lip portion and the shoulder 16, so as to provide a firm water-tight contact with the spherical portion 20 of the coupling member 12, the neck or shank portion of which is considerably less in diameter than the opening at the lower end of the spherical portion 17. The coupling member 12 is thus permitted angular movement both on its own axis and in the direction of the axis of itself and the coupling element, thereby providing a universal connection between the two. The coupling member 12 is enlarged at the lower end, as indicated at 21, and is forced into one end of the flexible tubular member 11 which is exteriorly beaded, as indicated at 22, adjacent its end. The enlarged portion of the coupling member 12 enters the tubular member to a point which places the bead 22 at approximately the line of juncture of the enlarged portion 21 of the shank or neck of the coupling member 12. A clamp member 23 loosely surrounding the shank of the coupling member 12 serves to secure the flexible tubular member 11 to the coupling member 12, this clamp member being of generally flaring form with an annular bulged portion 24 which serves as a seat for the bead, the skirt portion 25 being flared, so that the clamp member may be readily forced onto the beaded portion of the tubular member.

The coupling member 14 is identical with the coupling member 12 with the exception that there is substituted for the spherical portion 20 an enlarged terminal portion 21. The coupling member 14 is connected with the lower end of the flexible tubular member 11 just as the coupling member 12 is connected with the same.

The hose 26, to be attached to the device, if it has not been originally provided with a peripheral bead 22, has applied to its end the attachable bead 27 which is in the form of a rubber ring with inwardly projecting spurs 28, these being preferably tacks inset in the bead when the same is molded, their heads being completely enclosed by the material of the ring or bead. The bead can thus be attached to the proper end of the hose and the spurs will penetrate the latter but will not extend through the same and when the enlarged portion 21 of the coupling member 14 is inserted in the hose, the clamp ring 23 is pulled down to engage over the ring or attached bead 27.

In use, the invention is applicable either for garden hose or for fire hose and is designed to be attached to a hydrant to remain in position thereon, the hose being connected and disconnected at the coupling member 14. When the hose is to be detached, the clamp ring 23 is released and the hose withdrawn from the coupling member 14, being reattached by reversing these operations. When in use, the device avoids bending the hose at the point of attachment with the hydrant, since the universal joint provided by the cooperating globular portions 20 and 17 provides for universal movement.

In the modification shown in Figures 5 and 6, the coupling member 12a is identical with the coupling member 12 where it connects with the coupling element 10, but is modified at that end which connects with the flexible tubular member 11a, being alternately bulged and contracted circumferentially as indicated at 28. The flexible tubular member 11a in this form of the invention is provided with an internal bead 29 which seats in the contracted portion between the two bulges of the coupling member 12a but is exteriorly provided with the bead 30 which seats in an annular bulge 31 of the clamp member 32, the latter being in the form of a cap slidable over the neck portion of the coupling member 12a but receivable over the end of the flexible tubular member 11a, after the coupling member 12 has been inserted into the latter where its bead 29 will engage in the contracted portion of the coupling member. In this form of the invention, the connection with the hose may be in the same manner as the flexible tubular member is connected with the coupling member 12a or it may be in the form illustrated in Figure 1 for connecting the hose to the device.

The flexible tubular members 11 and 11a may have their walls reinforced to prevent acute bends but at the same time leave them resilient, such reinforcement being in that portion of the walls of the tubular members comprehended between the connected ends of the coupling members 12 and 14.

The invention having been described, what is claimed as new and useful is:

1. A device for the purpose indicated comprising a flexible tubular member and means for coupling it to a fire hydrant and comprising a universal joint, and a coupling member at the extremity of the flexible tubular element, the coupling member being of tubular form and enlarged for insertion in the extremity of the hose, and a clamp ring slidable on the coupling member and engageable over the extremity of an attached hose, the hose being provided with a bead at said extremity and the clamp ring being formed with an angular bulged portion serving as a seat for the bead and a flared skirt portion extending from the bulged portion and serving to direct the bead into the bulged portion.

2. A device for the purpose indicated comprising a flexible tubular member and means for coupling it to a fire hydrant and comprising a universal joint, and a coupling member at the extremity of the flexible tubular element, the coupling member being of tubular form and enlarged for insertion in the extremity of the hose, a clamp ring slidable on the coupling member and engageable over the extremity of an attached hose, and a bead attachable to the extremity of the hose and comprising a rubber ring with internally projecting spurs engageable in the wall of the hose, the bead seating in an annular bulge formed in the clamp ring.

CHARLES FRANKLIN EMERY, Jr.